(12) United States Patent
Cha

(10) Patent No.: US 7,747,278 B2
(45) Date of Patent: Jun. 29, 2010

(54) METHOD FOR TRANSMITTING MESSAGE OF MOBILE TERMINAL

(75) Inventor: Dal-Yong Cha, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 11/562,370

(22) Filed: Nov. 21, 2006

(65) Prior Publication Data

US 2007/0093256 A1 Apr. 26, 2007

Related U.S. Application Data

(63) Continuation of application No. 11/023,474, filed on Dec. 29, 2004.

(30) Foreign Application Priority Data

Dec. 30, 2003 (KR) ...................... 10-2003-0100732

(51) Int. Cl.
H04M 1/00 (2006.01)
(52) U.S. Cl. ................. 455/556.1; 455/414.1; 455/466; 455/567
(58) Field of Classification Search ............... 455/556.1
See application file for complete search history.

(56) References Cited

U.S. PATENT DOCUMENTS

| 6,230,019 | B1* | 5/2001 | Lee | 455/466 |
| 6,529,742 | B1* | 3/2003 | Yang | 455/556.1 |
| 2002/0094847 | A1* | 7/2002 | Han | 455/567 |
| 2007/0190987 | A1* | 8/2007 | Vaananen | 455/414.1 |

FOREIGN PATENT DOCUMENTS

| CN | 1366435 A1 | 8/2002 |
| EP | 1 365 607 A2 | 11/2003 |
| JP | 10-190791 A | 7/1998 |
| JP | 2002-101192 A | 4/2002 |
| JP | 2002-152484 A | 5/2002 |
| JP | 244793 A | 8/2002 |
| JP | 2003-008705 A | 1/2003 |
| JP | 2003-134194 A | 5/2003 |
| JP | 2003-229931 A | 8/2003 |
| JP | 2004-353442 A | 12/2004 |
| KR | 1020020030773 A | 4/2002 |
| KR | 2002-0036593 A | 5/2002 |
| KR | 2003-0034964 A | 5/2003 |
| KR | 2003-0049436 A | 6/2003 |
| WO | WO-02/082786 A1 | 10/2002 |
| WO | WO-03/010983 A2 | 2/2003 |

OTHER PUBLICATIONS

The Operations Magazine of Guangdong province, "the operations in the GSM digital mobile communication", vol. 5, pp. 30, 32, 34, (1996).
Nokia unveils the 6600, Jun. 16, 2003.
User's Guide, Nokia 6600, pp. 1-10, 66-102, Nokia 2004.
"Nokia continues to gain market share in phones with excellent profitability", Jul. 17, 2003, Nokia Corporate Press/Press Releases/Archive/Archive ShowPressRelease, retrieved from website: www.nokia.com/presse, "http://www.nokia.com/press/press-releases/archive/archiveshowpressrelease?newsid_911104".

* cited by examiner

*Primary Examiner*—Yuwen Pan
*Assistant Examiner*—Ajibola Akinyemi
(74) *Attorney, Agent, or Firm*—Birch, Stewart, Kolasch & Birch, LLP

(57) ABSTRACT

A method for transmitting a message from a mobile terminal in a mobile communication system. The method includes displaying a list of messages attempted to be transmitted, selecting a message from the list of transmitted messages that was unsuccessfully transmitted, and displaying detailed information about the selected message that was unsuccessfully transmitted.

16 Claims, 4 Drawing Sheets

(a)

O : Transmission successful
X : Transmission failed

METHOD FOR TRANSMITTING MESSAGE OF MOBILE TERMINAL

CROSS-REFERENCE TO A RELATED APPLICATION

This application is a continuation of co-pending U.S. application Ser. No. 11/023,474 filed on Dec. 29, 2004, which is incorporated by reference. This application also claims priority under 35 USC 119(a) of Korean patent application Ser. No. 10-2003-0100732, filed on Dec. 30, 2003, and to the U.S. application Ser. No. 11/023,474 filed on Dec. 29, 2004.

BACKGROUND OF THE INVENTION

1. Field of the Invention

The present invention relates to a method and apparatus for transmitting a messages between mobile terminals.

2. Description of the Related Art

Mobile terminals provide a variety of services in addition to a calling service. For example, mobile terminals allow a user to access a message transmission service to send and receive text or multimedia messages, access the Internet, play games, download ring tones, etc. The message transmission service includes a SMS (short message service) for transmitting text data that is within 80 bytes, for example. The message transmission service also includes a MMS (Multimedia Message Service) for transmitting music, images, movies, etc. The message being transmitted and received may also be a combination of the SMS and MMS type messages. Thus, using the message transmission service, the user can create messages using the keys provided on the mobile terminal and then transmit the message to another party.

However, in the related art transmission method, the message transmission service is automatically terminated when a specific event occurs such as the user closing a folder of the mobile terminal while the message is being transmitted. The same is true with respect to a flipping closed a flip type terminal or sliding closed a sliding type terminal. For example, after the user initiates transmission of a SMS message and closes the mobile terminal before transmission of the SMS message is completed, the SMS message transmission is terminated (i.e., disrupted prior to completion).

Thus, in the related art method, the user must wait for the corresponding message to be completely transmitted before he or she closes the terminal. Thus, if the folder is inadvertently closed while the message is being transmitted, the user must recreate the message. This problem is more serious for MMS type messages. In more detail, the MMS type message typically includes more data than the SMS type message. Therefore, when a user transmits an MMS type message, he or she must keep the mobile terminal open for a longer time to complete transmission of the MMS.

SUMMARY OF THE INVENTION

Accordingly, an object of the present invention is to provide a method and an apparatus for transmitting a message of a mobile terminal capable of performing transmission of a message continuously, i.e without disruption, even if a specific event occurs that normally causes a message termination while the message is being transmitted. The specific event that would normally cause an interruption may be disregarded, i.e. ignored, by setting an event disregard mode for the specific event.

To achieve at least the above objects in whole or in parts, the present invention provides in one aspect a method for transmitting a message from a mobile terminal in a mobile communication system. The method includes displaying a list of messages attempted to be transmitted, selecting a message from the list of transmitted messages that was unsuccessfully transmitted, and displaying detailed information about the selected message that was unsuccessfully transmitted.

In another aspect, the present invention provides a mobile terminal including a transmitting unit configured to transmit messages, a display configured to displaying a list of messages attempted to be transmitted, and a selection option on the display configured to select a message from the list of transmitted messages that was unsuccessfully transmitted. Further, the display displays detailed information about the selected message that was unsuccessfully transmitted.

BRIEF DESCRIPTION OF THE DRAWINGS

Invention will be described in detail with reference to the following drawings in which like reference numerals refer to like elements wherein.

DETAILED DESCRIPTION OF THE PREFERRED EMBODIMENTS

An exemplary embodiment of the present invention will now be described in detail with reference to the accompanying drawings.

One or more embodiments are proposed for performing a transmission of a message without interruption even if a specific event occurs that normally terminates the message transmission. For this purpose, the embodiment allows an event disregard mode to be set for one or more specific events, for example through a menu.

When the disregard mode is set for a specific event, the message continues to be transmitted without disruption even if the specific event occurs. Specific events include closing/opening of a folder, flip or a sliding cover of the mobile terminal; receipt of a call from another party; etc. Further, a message can be a SMS type message, an MMS type message, or a combination of both.

Figure 1:
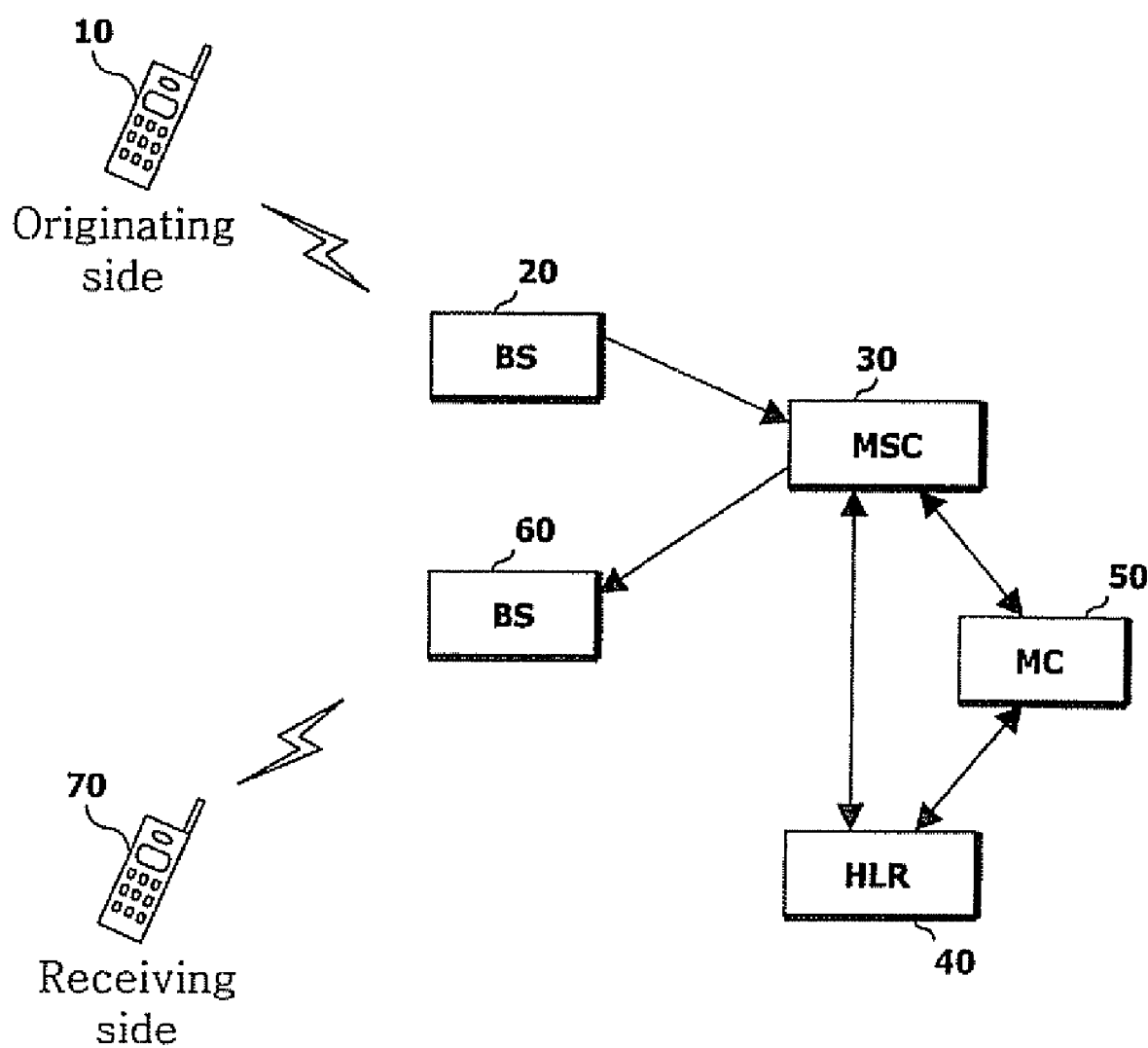
FIG. 1 illustrates a mobile communication system in accordance with an embodiment of the present invention.

Turning first to FIG. 1, which illustrates a mobile communication system according to an embodiment of the present invention. As illustrated in FIG. 1, the mobile communication system includes mobile terminals (MTs) 10 and 70, base stations (BSs) 20 and 60, a Mobile Switching Center (MSC) 30, a Home Location Register (HLR) 40, and a Message Center (MC) 50.

The BSs 20 and 60 communicate with the MTs 10 and 70 using a radio interface. The BSs 20 and 60 also control radio and cable links, and perform a handoff function to maintain continuity of call communication while a user (i.e. the mobile terminal) is moving. Further, to process origination and reception requests received from the mobile terminals 10 and 70, the MSC 30 cooperates with another MSC and performs an inquiry on a subscriber from the HLR 40.

In addition, when the MSC 30 receives a message (SMS type message, MMS type message, a combination of both, etc.) from the mobile terminals 10 and 70, the MSC 30 transfers the message to the MC 50. Conversely, if the MSC 30 receives the message from the MC 50, the MSC 30 transfers the message to the BSs 20 and 60. In this way, the message can be transmitted and received to and from the mobile terminals 10 and 70, for example through a paging channel.

In FIG. 1, the mobile terminal 10 is designated as the originating side, i.e. the message transmitter and the mobile terminal 70 is designated as the receiving side. However, the present invention is not limited to this designation. That is, both mobile terminals have the capability to both transmit and receive.

Further, the HLR 40 stores subscriber information and position information of the mobile terminals and designates a path to the mobile terminals with respect to received calls. The MC 50, which is an independent node connected to the HLR 40 and the MSC 30, recognizes positions of the mobile terminals and also transfers messages to mobile subscribers.

In addition, when the MC 50 transmits the message, if a receiving mobile terminal is in a state so that it cannot receive the message, the MC 50 temporarily stores the message for a predetermined period of time and then again transmits the message to the receiving mobile terminal. For example, the receiving mobile terminal may be in a burst state at an arbitrary point. As another example, the receiving mobile terminal may be itself transmitting or receiving another message.

When the MC 50 receives the message from the mobile terminals 10 and 70 through the BSs 20 and 60 and the through MSC 30, the MC 50 temporarily stores the received message in a queue. Thereafter, the MC 50 identifies the receiving mobile terminal, the identity of which is transmitted together with the message. The MC 50 also traces a position of the corresponding receiving mobile terminal through cooperation with the HLR 40. Once the position of the receiving mobile terminal is determined, the MC 50 transmits the message.

Figure 2:
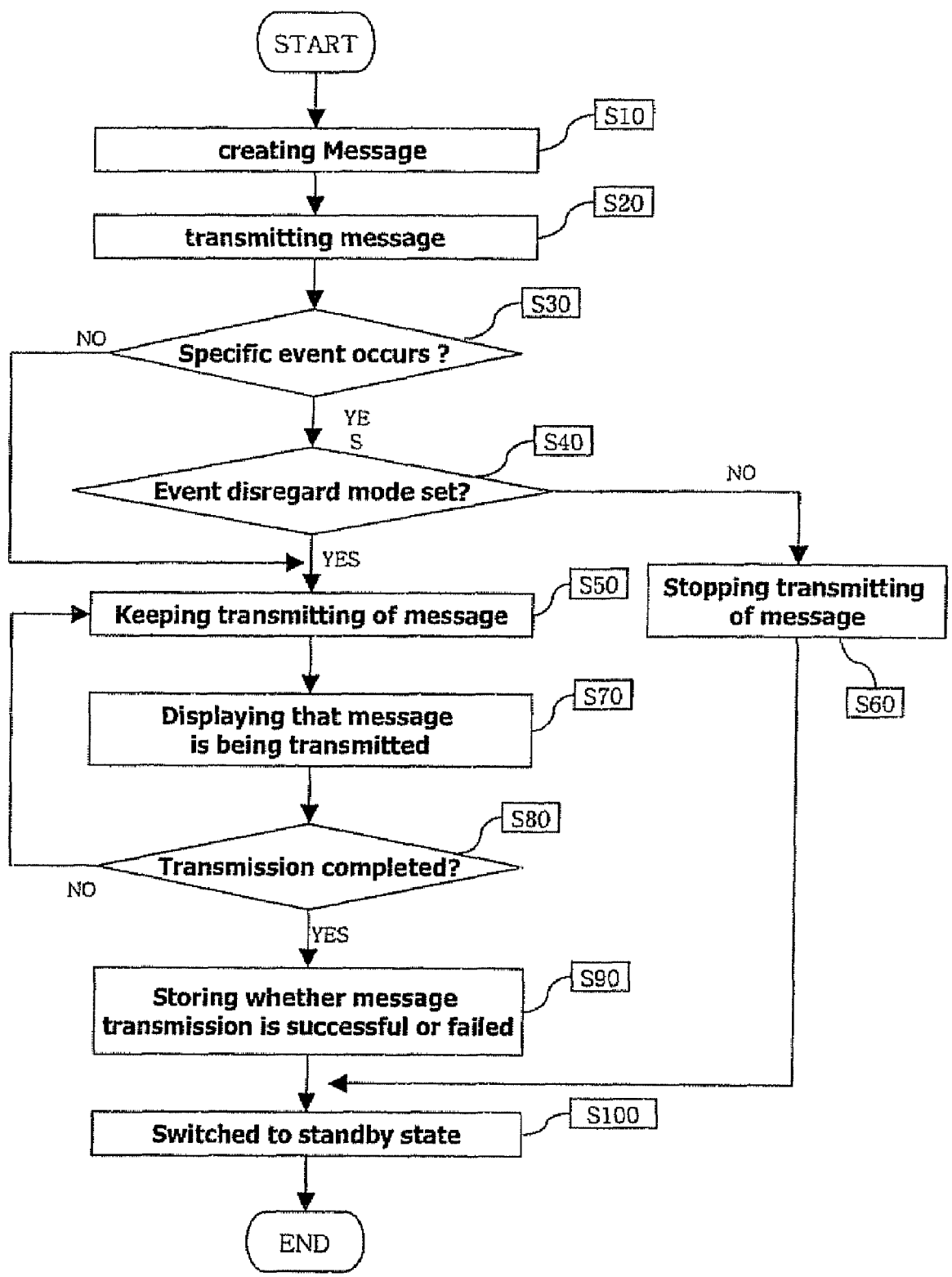
FIG. 2 is a flowchart illustrating a method for transmitting a message of a mobile terminal in accordance with an embodiment of the present invention.

The messaging operation of the mobile communication system constructed as described above is described as follows. In more detail, FIG. 2 is a flowchart of a method for transmitting a message from a mobile terminal in accordance with an embodiment of the present invention. More specifically, the flowchart illustrates an exemplary operation that is carried out in the event of an occurrence of a specific event.

Figure 4:
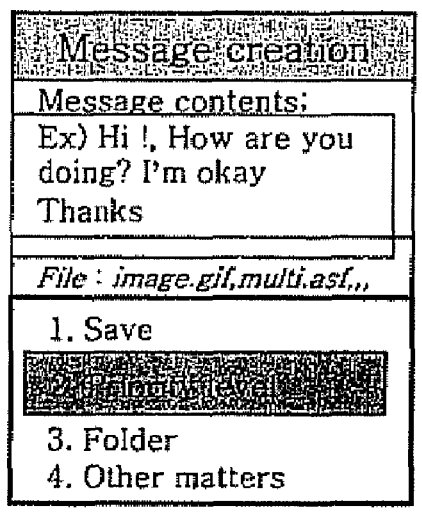
FIG. 4 illustrates an exemplary embodiment of the SMS/MMS message.

As shown in FIG. 2, a user creates a message (a SMS type message, an MMS type message, or a combination of both) as desired (step S10). The user may also select information related to the message such as storing the message, setting a priority level of the message, selecting a type of storage area for the message, etc as shown in FIG. 4. Referring back to FIG. 2, when the message is created, the user initiates transmission of the message through the mobile terminal, for example by using a certain origination key on the terminal (step S20).

Thereafter, if a specific event, such as closing of the folder of the mobile terminal or receiving a call from another party, occurs while the message is being transmitted (Yes in step S30), the mobile terminal determines whether the specific event may be disregarded, i.e. whether the disregard mode has been set for the specific event (step S40). If the event disregard mode has not been set for the specific event (No in step S40), the mobile terminal terminates transmission of the message (step S60) and then switches to a standby state (step S100).

If, however, the event disregard mode has been set for the specific event (Yes in step S40), the mobile terminal continues transmission of the message without interruption (step S50). In other words, if the event disregard mode has been set for the specific event, the mobile terminal disregards the specific event when it occurs and continues transmission of the message. The mobile terminal also informs the user about the transmission state of the message (step S70). In other words, the mobile terminal informs the user that the message is being transmitted during the transmission of the message.

For example, if the mobile terminal has an external LCD (Liquid Crystal Display) screen, the mobile terminal may inform the user that the message is being transmitted on the external LCD screen. The information may be through text or through animation. As another example, a blinking light may be used to indicate that the transmission of the message is taking place. The blinking light may be provided via an LED device on the exterior of the mobile terminal. Further, if the specific event that occurs during the transmission of the message is a receipt of a call from another party, the mobile terminal accordingly informs the users.

Figure 5A:
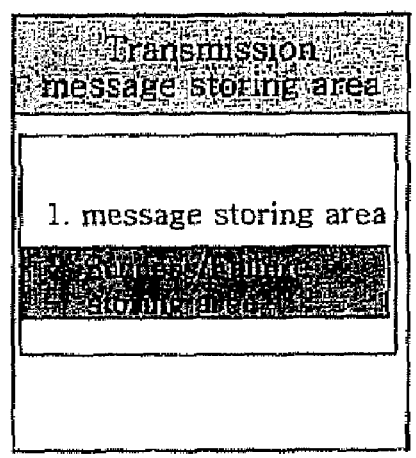
FIGS. 5(a)-5(c) illustrate an exemplary embodiment of checking whether the SMS/MMS message has been successfully transmitted.
Figure 5C:
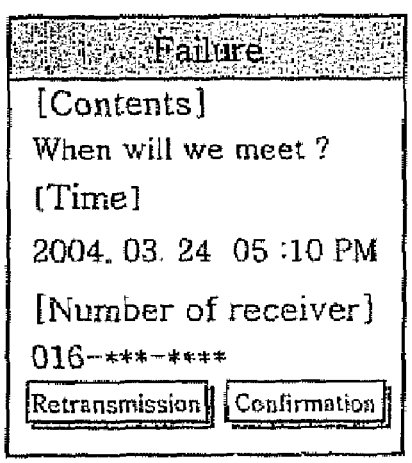
Figure 5B:
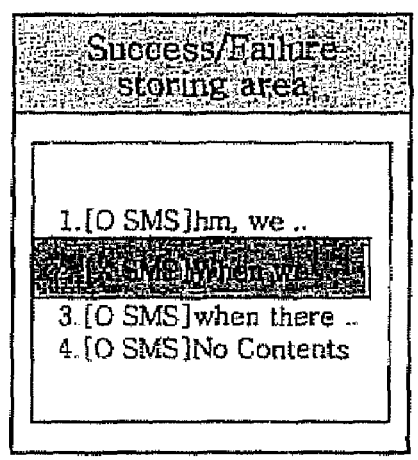

Thereafter, when the SMS/MMS message transmission is completed (Yes in step S80), the mobile terminal stores a information indicating the message transmission success/failure in a transmission message storing area of a memory as shown in FIGS. 5(a)-5(c) (step S90). For example, when the message transmission is completed, the mobile terminal may store information including an indication of whether or not the transmission of the message has been successful. This information may be stored in a success/failure storing area as shown in FIGS. 5(a) and 5(b).

Accordingly, with reference to FIG. 5(a), when the user selects a success/failure storing area (item 2) from the transmission message storing area, the mobile terminal displays the message transmission success/failure information as shown in FIG. 5(b). As shown in FIG. 5(b), the message or a portion of the message may be displayed along with the success or failure indication.

As shown in FIG. 5(b), the user can select a message that failed and view the stored information. For example, FIG. 5(c) illustrates an example of a message transmission success/failure information of a failed message transmission. As illustrated, the message which failed to be transmitted may be stored so that it can be retransmitted according to a user's desires. The failed message may also be stored as a module. In addition, the transmission time and the recipient's phone number may also be recorded as part of the message transmission success/failure information.

Further, if the original transmitted message includes an MMS message content, the transmission success/failure information may also include a portion of the content of the transmitted MMS message. One or more of the multimedia files added to make up the original MMS message may or may not be included in the message transmission success/failure information.

When the message transmission success/failure information is stored, the mobile terminal may switch to a standby state (step S100 in FIG. 2). Also, if the disregarded specific event is the receipt of a call from another party, the mobile terminal may switch an operation to perform the corresponding operation or otherwise switch to a state to receive the call.

Figure 3:
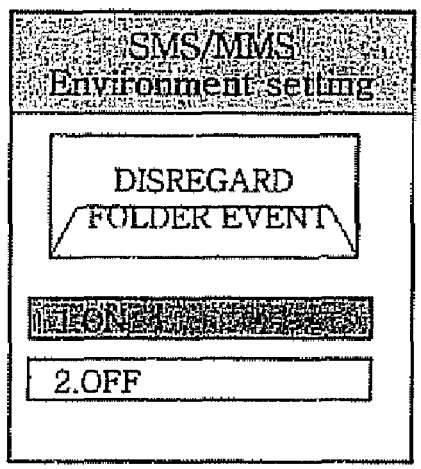
FIG. 3 illustrates an exemplary embodiment of an SMS/MMS environment set menu for setting an event disregard mode for a specific event.

In addition, the disregard mode may be set in multiple ways. For example, FIG. 3 is an embodiment of the present invention for setting the event disregard mode. As shown, the user may set the disregard mode for a specific event, in this instance a folder event, (i.e., a closing of phone's outer cover) is set to the "on" condition, meaning that the mobile terminal will disregard a closing of the phone's outer cover, and continue to transmit a message. When the event occurrence is set to 'ON', an occurrence of the event will be disregarded and the transmission of the message will not be interrupted. When the event occurrence is set to 'OFF' and the specific event occurs, the message transmission is interrupted and terminated.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for transmitting a message from a mobile terminal in a mobile communication system, said method comprising:

entering an event disregard mode and displaying an event disregard menu option on a display of the mobile terminal for selecting a plurality of specific events that are to be disregarded whenever the message is transmitted on the mobile terminal to at least one other mobile terminal, said plurality of specific events causing transmission of the message to fail, and said disregard menu option including an ON and an OFF selectable item for each of the plurality of specific events to indicate whether or not the plurality of specific events are to be disregarded, respectively, whenever the message is transmitted on the mobile terminal;

receiving, in response to a user input and prior to the transmission of the message, a selection signal indicating whether or not at least one of the plurality of specific events are to be disregarded whenever the message is transmitted on the mobile terminal;

transmitting, via a transmitter, the message to said at least one other terminal;

receiving, via a receiver, a signal indicating the transmission of the message has failed because the at least one of the specific events has occurred during the transmission of the message;

displaying, via a display, a list of messages attempted to be transmitted including at least the transmitted message that has failed;

receiving a selection signal indicating a selection of the transmitted message that has failed from the list of messages; and displaying information about the selected transmitted message that has failed, wherein the displayed list of messages attempted to be transmitted includes at least a portion of message contents contained within a listed message, and wherein the event disregard mode is entered before and is independent of creating and transmitting the message such that the plurality of specific events can be set to be disregarded or not disregarded without having to set the disregard mode for the plurality of specific events each time a message is created and transmitted.

2. The method of claim 1, wherein the displayed list of messages attempted to be transmitted includes information about whether a listed message is an SMS (Short Message Service) type message, a MMS (Multimedia Message Service) type message or a combination of both the SMS type message and the MMS type message.

3. The method of claim 1, wherein the displayed list of messages attempted to be transmitted includes information about whether a listed message was successfully transmitted or was unsuccessfully transmitted.

4. The method of claim 1, wherein the displayed information about the message that was unsuccessfully transmitted includes at least one of contents of the message, a time the message was attempted to be transmitted, and an address number of a terminal the message was attempted to be transmitted to.

5. The method of claim 1, further comprising:
    selecting by a user a retransmission option to retransmit the selected message that was unsuccessfully transmitted.

6. The method of claim 1, where the displayed information includes an attached file that was included in the message unsuccessfully transmitted.

7. The method of claim 1, further comprising:
    storing the list of messages attempted to be transmitted in a success/failure storage area in a memory of the mobile terminal.

8. A mobile terminal, comprising:
    a transmitting unit configured to transmit a message;
    an input unit configured to enter an event disregard mode;
    a display unit configured to display, when the event disregard mode is entered, an event disregard menu option for selecting a plurality of specific events that are to be disregarded whenever the message is transmitted on the mobile terminal, said plurality of specific events causing transmission of the message to fail, said transmission of the message being a transmission of a short message to at least one other mobile terminal, and said disregard menu option including an ON and an OFF selectable item for each of the plurality of specific events to indicate whether or not the plurality of specific events are to be disregarded, respectively, whenever the message is transmitted on the mobile terminal;
    a controller configured to receive, in response to a user input and prior to the transmission of the message, a selection signal indicating whether or not at least one of the plurality of specific events are to be disregarded whenever the message is transmitted on the mobile terminal, and to receive a signal indicating the transmission of the message has failed because the specific event has occurred during the transmission of the message;
    said display configured to display a list of messages attempted to be transmitted including at least the transmitted message that has failed; and
    a selection unit configured to select the transmitted message that has failed from the list of messages,
    wherein the display is further configured to display information about the selected transmitted message that has failed,
    wherein the displayed list of messages attempted to be transmitted includes at least a portion of message contents contained within a listed message, and
    wherein the event disregard mode is entered before and is independent of creating and transmitting the message such that the plurality of specific events can be set to be disregarded or not disregarded without having to set the disregard mode for the plurality of specific events each time a message is created and transmitted.

9. The mobile terminal of claim 8, wherein the displayed list of messages attempted to be transmitted includes information about whether a message is an SMS (Short Message Service) type message, a MMS (Multimedia Message Service) type message or a combination of both the SMS type message and the MMS type message.

10. The mobile terminal of claim 8, wherein the displayed list of messages attempted to be transmitted includes information about whether a message was successfully transmitted or was unsuccessfully transmitted.

11. The mobile terminal of claim 8, wherein the displayed information about the message that was unsuccessfully transmitted includes at least one of contents of the message, a time the message was attempted to be transmitted, and an address number of a terminal the message was attempted to be transmitted to.

12. The mobile terminal of claim 8, where the displayed information includes a retransmission option allowing a user to retransmit the selected message that was unsuccessfully transmitted.

13. The mobile terminal of claim 8, where the displayed information includes an attached file that was included in the message unsuccessfully transmitted.

14. The mobile terminal of claim 8, further comprising:
   a memory configured to store the list of messages attempted to be transmitted in a success/failure storage area of the memory.

15. The method of claim 8, wherein the specific event causing the transmission of the message to fail is an opening and closing of the mobile terminal or an incoming phone call.

16. The mobile terminal of claim 8, wherein the specific event causing the transmission of the message to fail is an opening and closing of the mobile terminal or an incoming phone call.

* * * * *